(12) United States Patent
Ohara et al.

(10) Patent No.: US 10,371,937 B2
(45) Date of Patent: Aug. 6, 2019

(54) PROJECTION DISPLAY APAPRATUS (71) Applicant: CANON KABUSHIKI KAISHA, Tokyo (JP)

(72) Inventors: Shinya Ohara, Utsunomiya (JP); Tetsuya Kagawa, Sakura (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/888,215

(22) Filed: Feb. 5, 2018

(65) Prior Publication Data
US 2018/0231764 A1 Aug. 16, 2018

(30) Foreign Application Priority Data
Feb. 10, 2017 (JP) ................................ 2017-023115

(51) Int. Cl.
| H04N 5/63 | (2006.01) |
| G02B 26/00 | (2006.01) |
| G03B 21/20 | (2006.01) |
| H04N 9/31 | (2006.01) |
| G02B 27/10 | (2006.01) |
| G02B 27/14 | (2006.01) |

(52) U.S. Cl.
CPC ....... G02B 26/008 (2013.01); G02B 27/1006 (2013.01); G02B 27/141 (2013.01); G03B 21/204 (2013.01); H04N 5/63 (2013.01); H04N 9/3144 (2013.01); H04N 9/3155 (2013.01); H04N 9/3158 (2013.01); H04N 9/3179 (2013.01)

(58) Field of Classification Search
CPC .......... H04N 5/63; H04N 9/31; H04N 9/3144; H04N 9/3179; G02B 26/008; G03B 21/204

USPC ............................ 348/730, 743, 744; 353/84
See application file for complete search history.

(56) References Cited

U.S. PATENT DOCUMENTS

| 8,348,435 B2* | 1/2013 | Ogino .................... G03B 33/08 353/84 |
| 8,500,289 B2 | 8/2013 | Shibasaki |
| 9,028,073 B2* | 5/2015 | Cheng .................... G03B 21/16 353/52 |
| 9,063,403 B2 | 6/2015 | Tsuda et al. |
| 9,304,382 B2 | 4/2016 | Toyooka |
| 9,818,374 B2* | 11/2017 | Ishizu ..................... G09G 5/18 |
| 2015/0334361 A1 | 11/2015 | Tsuji |

(Continued)

FOREIGN PATENT DOCUMENTS

| JP | 4936091 B2 | 5/2012 |
| JP | 2013080091 A | 5/2013 |
| JP | 5262098 B2 | 8/2013 |

(Continued)

*Primary Examiner* — Trang U Tran
(74) *Attorney, Agent, or Firm* — Rossi, Kimms & McDowell LLP (57) ABSTRACT

A projection display apparatus (1) includes a wavelength conversion element (11) that converts a wavelength of light from a light source, a driver (13) that rotates the wavelength conversion element, and an internal power supply (15) that stores power in advance and to be used for an operation of the projection display apparatus after a supply of power from an external power supply is cut off, and the driver rotates the wavelength conversion element at the predetermined number of rotations per unit time by using the power of the internal power supply.

9 Claims, 6 Drawing Sheets (56) References Cited

U.S. PATENT DOCUMENTS

2018/0217483 A1* 8/2018 Ashizawa ............ G03B 21/206

FOREIGN PATENT DOCUMENTS

| JP | 5703631 B2 | 4/2015 |
| JP | 5799756 B2 | 10/2015 |
| JP | 2015215551 A | 12/2015 |

* cited by examiner

|  | BLANK MODE | POWER MANAGEMENT MODE |
|---|---|---|
| LOWER LIMIT NUMBER OF ROTATIONS | 3000[rpm] | 1000[rpm] |

NUMBER OF ROTATIONS IN NORMAL MODE=5000[rpm]

FIG. 8

PROJECTION DISPLAY APAPRATUS

BACKGROUND OF THE INVENTION

Field of the Invention

The present invention relates to a projection display apparatus.

Description of the Related Art

In recent years, a projection display apparatus using a solid-state light source such as a laser as a light source is proposed. The brightness of the laser is strong in a specific wavelength band, but it is weak in other wavelength bands. Therefore, it is necessary to enhance the brightness in the wavelength band other than the specific wavelength band of the laser by using a wavelength conversion element such as a phosphor. When the phosphor is irradiated with light, the temperature of the phosphor becomes high, and as a result, the phosphor deteriorates and it cannot obtain sufficient characteristics. Therefore, a configuration is known in which a rotary plate coated with the phosphor is rotated at the predetermined number of rotations to dissipate heat.

Japanese Patent No. 4936091 discloses a method of controlling the number of rotations of the phosphor depending on the projection level of the light source to prevent deterioration of the phosphor. Japanese Patent No. 5703631 discloses a method of controlling a light source and a panel in accordance with deterioration of the phosphor. Japanese Patent No. 5262098 discloses a projector assuming that it is not used and transferring to a power saving mode where a lamp is not turned on when a change of an image input to the projector is not more than a predetermined value with the passage of time. Japanese Patent No. 5799756 discloses a projector that turns on an excitation light source at a low output when the number of rotations of the phosphor is low in order to shorten the time to turn on the light source and increases the output of the excitation light source as the number of rotations increases.

However, in the configurations of Japanese Patent No. 4936091 and Japanese Patent No. 5703631, a case where a commercial power supply (an external power supply that supplies power to an apparatus from an outside of the apparatus) is cut off during lighting of the light source (particularly, a case where a short-time power failure or a short-time voltage decrease called instantaneous interruption or instantaneous power failure occurs) is not considered. In the conventional configuration, when the external power supply is cut off during the lighting of the light source, the light source is turned off and the rotation of the phosphor is stopped in order to prevent deterioration of the phosphor. In a case of restarting after the external power supply is recovered, there is a possibility that the phosphor deteriorates if the light source is immediately turned on again, and accordingly it is necessary to turn on the light source again after rotating the phosphor up to the predetermined number of rotations again. In this case, since it takes a certain period of time for the number of rotations to reach the predetermined number of rotations, the restart time becomes long.

Further, Japanese Patent No. 5262098 and Japanese Patent No. 5799756 do not describe a method for realizing power saving and long life of a motor when the excitation light source is used and the phosphor is rotated by the motor.

SUMMARY OF THE INVENTION

The present invention provides a projection display apparatus capable of preventing deterioration of a phosphor and shortening a restart time when an external power supply is cut off during lighting of a light source. Further, the present invention provides a projection display apparatus capable of realizing power saving and long life of a driver (motor) that rotates a wavelength conversion element (phosphor).

A projection display apparatus as one aspect of the present invention includes a wavelength conversion element configured to convert a wavelength of light from a light source, a driver configured to rotate the wavelength conversion element, and an internal power supply configured to store power in advance and to be used for an operation of the projection display apparatus after a supply of power from an external power supply is cut off, and the driver is configured to rotate the wavelength conversion element at the predetermined number of rotations per unit time by using the power of the internal power supply.

A projection display apparatus as another aspect of the present invention includes a light source, a wavelength conversion element configured to convert a wavelength of light from the light source, a driver configured to rotate the wavelength conversion element, and a controller configured to control the light source and the driver, and the controller is configured to, in a first mode, rotate the wavelength conversion element at the first number of rotations per unit time, in a second mode where an output of the light source is reduced, decrease the number of rotations per unit time of the wavelength conversion element to the second number of rotations per unit time, and in a third mode where the output of the light source is reduced, decrease the number of rotations per unit time of the wavelength conversion element to the third number of rotations per unit time that is different from the second number of rotations per unit time.

Further features of the present invention will become apparent from the following description of exemplary embodiments referring to the attached drawings.

DESCRIPTION OF THE EMBODIMENTS

Exemplary embodiments of the present invention will be described below referring to the accompanied drawings.

Embodiment 1

Figure 1:
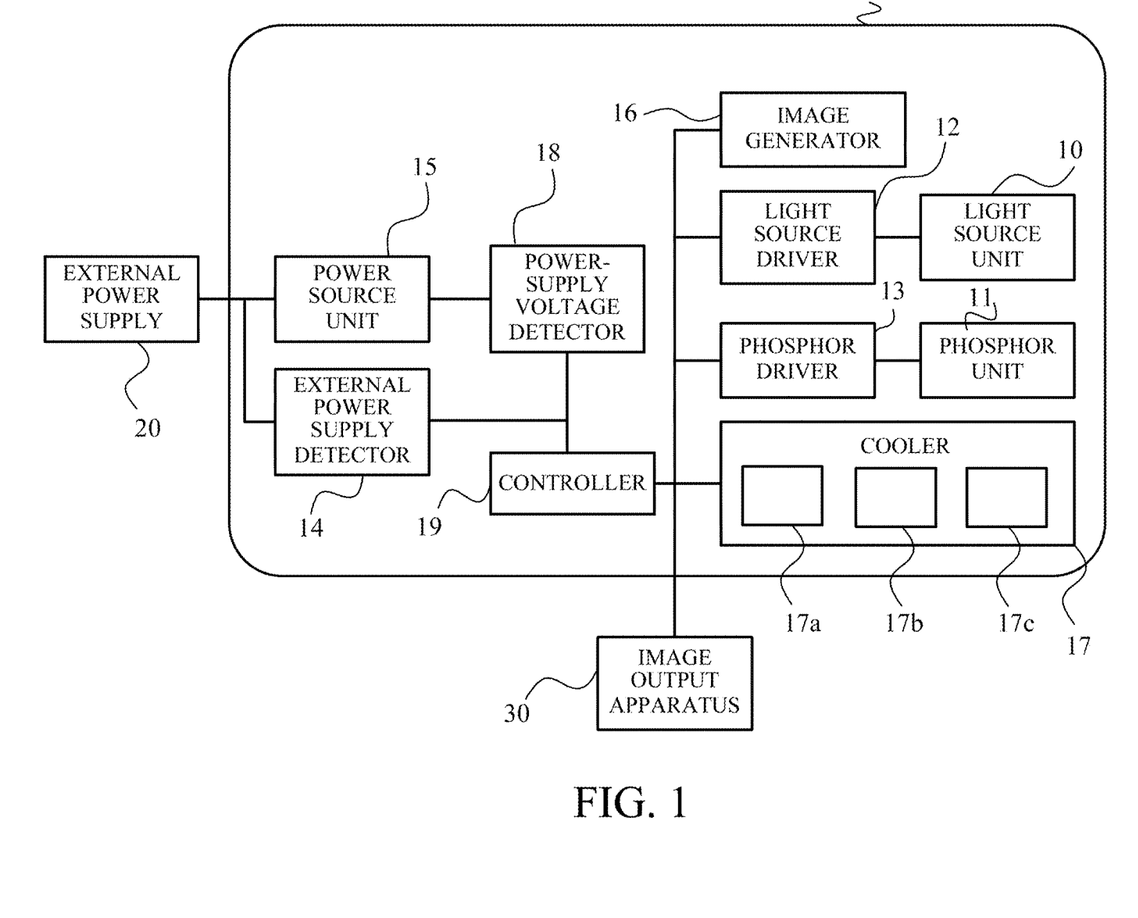
FIG. 1 is a block diagram of a projection display apparatus in Embodiment 1.

First, referring to FIG. 1, a configuration of a projection display apparatus (projector) in Embodiment 1 of the present invention will be described. FIG. 1 is a block diagram of the projection display apparatus (projector 1) in this embodiment. The projector 1 includes a light source unit 10, a phosphor unit 11, a light source driver 12, a phosphor driver 13, an external power detector 14, a power supply unit 15, an image generator 16, a cooler 17, a power-supply voltage detector 18, and a controller 19.

The light source unit 10 includes a light source (excitation light source) such as a laser or an LED. The light source driver 12 that drives the light source drives the light source unit 10 turns on or turns off the light source by driving the light source unit 10 based on a command from the controller 19. The phosphor unit 11 is a wavelength conversion element that converts a wavelength of light from the light source, and it is configured by a phosphor layer and a disk-shaped rotating body coated with the phosphor layer. The phosphor driver 13 is a driver (motor) that rotates (revolves) the phosphor unit 11 based on a command from the controller 19 during image projection. The phosphor unit 11 performs wavelength conversion of the light from the light source unit 10 while rotating during the image projection. The number of rotations (the number of rotations per unit time, or rotation speed) of the phosphor unit 11 can be arbitrarily set.

The external power supply detector 14 detects connection between the projector 1 and the external power supply 20 (i.e., external power supply such as an AC power supply). The controller 19 determines whether or not the supply of power from the external power supply 20 is cut off (i.e., whether or not the connection with the external power supply 20 is disconnected) based on an output signal from the external power supply detector 14. In this embodiment, when a voltage supplied from the external power supply 20 is equal to or lower than a predetermined voltage for a predetermined period of time or more (i.e., when an effective value of the voltage of the external power supply 20 is not lower than 0 V and not higher than the predetermined voltage), the controller 19 determines that the external power supply 20 is cut off (interrupted). According to this embodiment, it is possible to simultaneously detect both short-time power failure and short-time voltage decrease.

The power supply unit 15 is connected to the external power supply 20, and it converts a voltage from the external power supply 20 to output a predetermined voltage to supply power to each part of the projector 1. The image generator 16 includes a plurality of panels (light modulation elements), and it generates an image (projected image) by using light from the light source based on an image signal (control signal) from an image output apparatus 30. The image generator 16 is operable in a plurality of operation modes, and it can operate by switching between at least a normal mode and a power saving mode in which immediate recovery is possible. The cooler 17 cools each part of the projector 1. In this embodiment, the cooler 17 includes a fan (first fan) 17a that cools the phosphor driver (driver) 13, a fan (second fan) 17b that cools the light source unit 10, and a fan (third fan) 17c that cools the image generator 16. The cooler 17 can operate in a plurality of operation modes, and it can operate by switching between at least the normal mode and the power saving mode in which immediate recovery is possible.

The power-supply voltage detector 18 detects an output voltage of the power supply unit 15. The controller 19 can determine whether or not the external power supply 20 is completely cut off (shut out or interrupted) based on an output signal of the power-supply voltage detector 18 (for example, when the output voltage of the power supply unit 15 is a second voltage lower than a predetermined voltage).

Further, the controller 19 controls each part of the projector 1. When the controller 19 determines that the external power supply 20 is cut off during lighting of the light source (in the case where a temporary interruption such as several milliseconds to several tens of milliseconds or the like occurs), the controller 19 controls the phosphor driver 13 so as to continue (maintain) the rotation of the phosphor unit (wavelength conversion element) 11. Here, continuing (maintaining) the rotation means to include any of the case of setting the number of rotations equal to or lower than the number of rotations in a state where the external power supply 20 is connected. That is, the controller 19 controls the phosphor driver 13 so as not to stop the rotation of the phosphor unit 11 (not to decrease the number of rotations).

Figure 2:
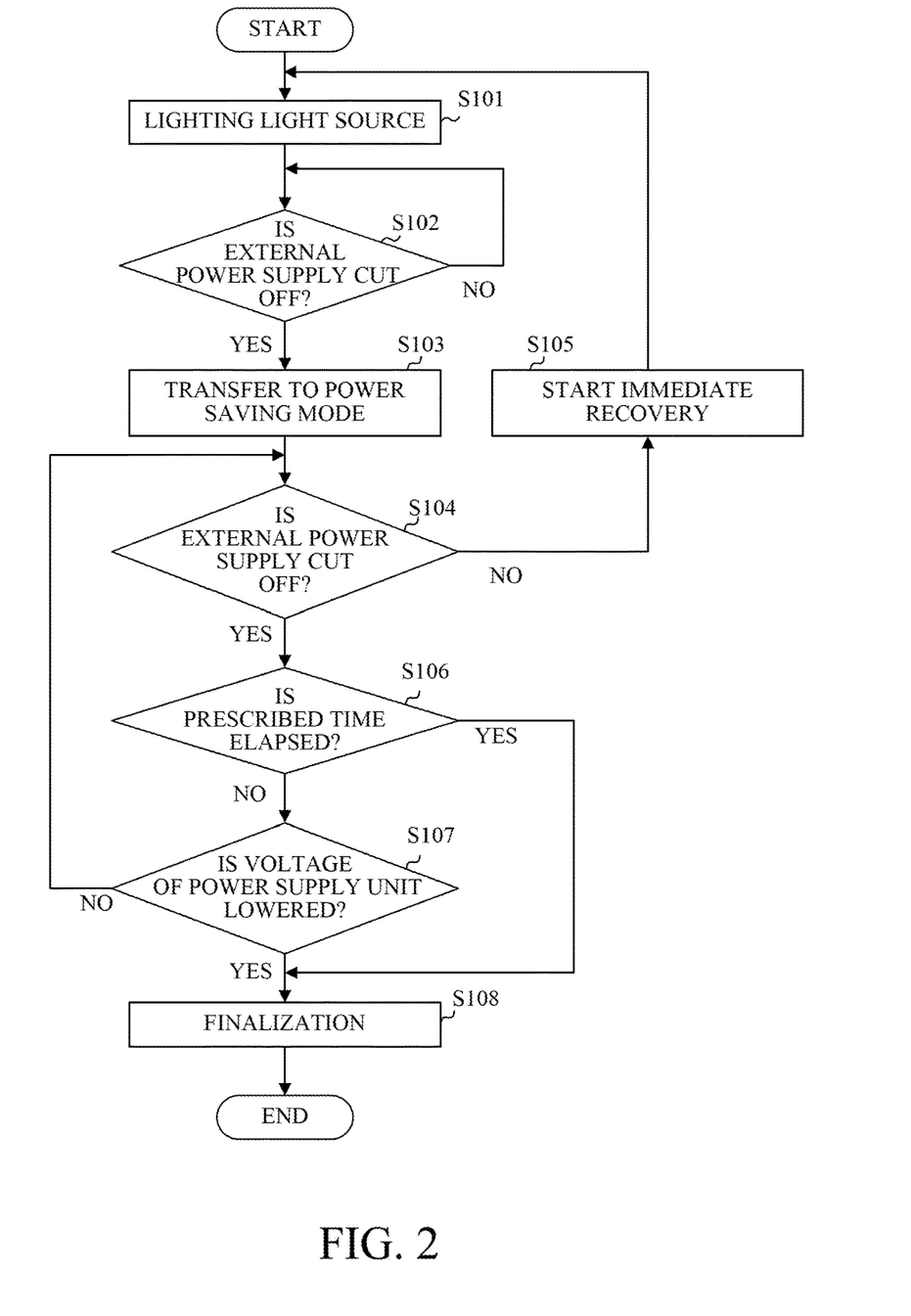
FIG. 2 is a flowchart illustrating an operation of the projection display apparatus in Embodiment 1.

Next, referring to FIG. 2, the operation of the projector 1 will be described. FIG. 2 is a flowchart illustrating the operation of the projector 1. Each step of FIG. 2 is mainly performed based on a command from the controller 19.

First, at step S101, the controller 19 turns on the light source according to an operation of a user. At this time, the controller 19 confirms the connection between the projector 1 and the external power supply 20 based on an output signal from the external power supply detector 14, and then the flow proceeds to step S102.

At step S102, the controller 19 determines whether or not the external power supply 20 is cut off (interrupted). In this embodiment, when the voltage supplied from the external power supply 20 is equal to or lower than the predetermined voltage for a predetermined period of time or more, the controller 19 determines that the external power supply 20 is cut off. However, this embodiment is not limited thereto, and the controller 19 may determine the interruption of the external power supply 20 by using other criteria. Alternatively, the controller 19 may be configured such that the following steps are continued using an internal power supply such as a capacitor, which will be described below, after the supply of the power from the external power supply 20 is cut off. For example, after the supply of the power from the external power supply 20 is cut off, the controller 19 may be configured such that a circuit used for the operation of the projector 1 is switched to a backup circuit that performs the following steps using the internal power supply. When the external power supply 20 is not cut off (when the external power supply 20 is being connected) at step S102, the controller 19 repeats step S102. On the other hand, when the external power supply 20 is cut off (interrupted), the controller 19 proceeds to step S103.

At step S103, the controller 19 transfers an operation mode of the projector 1 from the normal mode to the power saving mode. In the power saving mode (when the controller 19 determines that the external power supply 20 is cut off during the lighting of the light source), the controller 19 controls the operation of the phosphor driver 13 so as to continue (maintain) the rotation of the phosphor unit (wavelength conversion device) 11. In other words, the controller 19 controls the phosphor driver 13 so as to rotate the phosphor unit 11 at the same number of rotations as the number of rotations while the external power supply 20 is connected (i.e., the first number of rotations per unit time (for example, 9000 [rpm])). That is, even when the controller 19 determines that the external power supply 20 is cut off, it controls so as not to stop the rotation of the phosphor driver 13. In this embodiment, the power supply unit 15 includes a capacitor (internal power supply) that stores the voltage supplied from the external power supply 20. Therefore, after the external power supply 20 is temporarily cut off (interrupted), the operation of the projector 1 including the rotation operation of the phosphor driver 13 can be continued by using the voltage of the power stored in the capacitor for a certain period of time.

At step S103, the controller 19 may control the phosphor driver 13 so as to rotate at the second number of rotations (for example, 6000 [rpm]) smaller than the number of rotations (the first number of rotations) while the external power supply is connected. Preferably, the second number of rotations is equal to or greater than the number of rotations at which the projector 1 can immediately recover from the power saving mode to the normal mode.

Preferably, when determining that the external power supply 20 is cut off, the controller 19 controls the light source driver 12 so as to adjust (dim) the light source (i.e., darken the light source). Preferably, when determining that the external power supply 20 is cut off, the controller 19 controls the light source driver 12 so as to turn off the light source. Preferably, when determining that the external power supply 20 is cut off, the controller 19 controls the image generator 16 so as to generate a predetermined image that does not depend on an image signal from the image output apparatus 30 (i.e., transfer to the power saving mode for displaying black color).

Preferably, when determining that the external power supply 20 is cut off, the controller 19 decreases the number of rotations (i.e., rotation speed) of the fan 17*b* while maintaining the number of rotations of the fan 17*a*. Preferably, when determining that the external power supply 20 is cut off, the controller 19 decreases the number of rotations of the fan 17*c* while maintaining the number of rotations of the fan 17*a*.

Subsequently, at step S104, the controller 19 determines whether or not the interruption of the external power supply 20 continues. When the external power supply 20 is reconnected, the controller 19 proceeds to step S105 and starts immediate recovery. Specifically, the controller 19 transfers from the power saving mode to the normal mode, and it controls the phosphor driver 13 so as to rotate the number of rotation of the phosphor unit 11 at the first number of rotations. Then, the controller 19 returns to step S101, and it turns on the light source.

On the other hand, when the external power supply 20 is still cut off (interrupted) at step S104, the controller 19 proceeds to step S106. At step S106, the controller 19 determines whether or not a prescribed time has elapsed from the interruption of the external power supply 20 (i.e., whether or not the interruption of the external power supply 20 continues for the prescribed period). The prescribed time means a second period of time in which a state where the output voltage of the power supply unit 15 is lower than a predetermined voltage is longer than a predetermined period of time. When the prescribed time has elapsed, the controller 19 proceeds to step S108. On the other hand, when the prescribed time has not elapsed, the controller 19 proceeds to step S107.

At step S107, the controller 19 uses the power-supply voltage detector 18 to determine whether or not the output voltage of the power supply unit 15 is lowered (that is, whether or not the output voltage is the second voltage lower than the predetermined voltage). When the output voltage of the power supply unit 15 is higher than the second voltage, the controller 19 returns to step S104. On the other hand, when the output voltage of the power supply unit 15 is equal to or lower than the second voltage, the process proceeds to step S108. At step S108, the controller 19 determines that the external power supply 20 is completely cut off, and it transfers the projector 1 to a standby state to stop the operation of each part of the projector 1 (finalization).

According to this embodiment, it is possible to provide the projection display apparatus capable of preventing deterioration of the phosphor and shortening the restart time when the external power supply is cut off during lighting of the light source.

Embodiment 2

Figure 3:
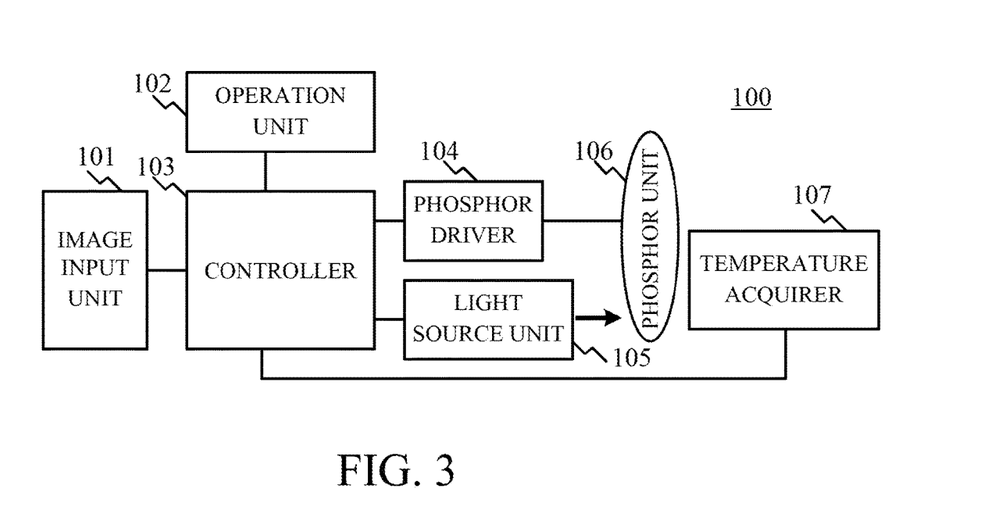
FIG. 3 is a block diagram of a projection display apparatus in Embodiment 2.

Next, referring to FIG. 3, a projection display apparatus in Embodiment 2 of the present invention will be described. FIG. 3 is a block diagram of a projection display apparatus (projector 100) in this embodiment. The projector 100 of this embodiment includes an image input unit 101, an operation unit 102, a controller 103, a phosphor driver 104, a light source unit 105, a phosphor unit 106, a temperature acquirer 107, and an image generator 108.

The image input unit 101 is an interface (IF) that receives image data output from an image output apparatus, such as a PC (Personal Computer) and a BD (Blu-ray Disc), and converts the image data into a signal for driving the image generator (liquid crystal panel) 108. The interface that is used for the image input unit 101 includes HDMI (registered trademark) (High-Definition Multimedia Interface), DP (Display Port), or the like. However, the interface is not limited to HDMI or DP as long as it has a role of inputting the image signal from the external image output apparatus to the projector 100.

The operating unit 102 is provided on an exterior of the projector 100 such that the user operates the projector 100, and it includes a plurality of push buttons, a plurality of LEDs (Light Emitting Diode), and the like. The push button includes a push button for turning on/off the power supply, a push button for selecting a display image input via the interface, and the like. In addition, the push button includes a push button for moving a cursor, such as up, down, left, and right, and a push button for displaying an OSD (ON Screen Display) to adjust image quality prepared therein. Further, the push button may include a push button for changing the shift, the focus, or the like of a lens provided in the projector 100. The operation unit 102 is not limited to the push button provided in the projector 100, but may be a remote control unit such as a remote controller that is operable by using wired or wireless communication. The LED is necessary for grasping the state of the projector 100. For example, the red LED lights up during a power standby state, the green LED lights up during projection, and the red LED flashes when an error occurs. As described above, the operation unit 102 collectively refers to functions such as push buttons and LEDs that are operated by the user and that are used for grasping the state of the projector 100.

The controller 103 controls each part of the projector 100. The controller 103 includes a microcomputer, an ASIC (Application Specific Integrated Circuit), an FPGA (Field-Programmable Gate Array), or the like. The controller 103 does not need to be single as hardware, and the microcomputer, the ASIC, the FPGA, or the like may share the functions. The controller 103 is connected to the image input unit 101, the operation unit 102, the phosphor driver 104, the light source unit 105, the temperature acquirer 107, and the image generator 108, and it instructs and controls each of these parts.

When the image input unit 101 includes a plurality of interfaces, a plurality of image output apparatuses (external apparatuses) may be connected to the plurality of interfaces at the same time. At this time, the image input unit 101 has a function of selecting which of the plurality of interfaces to send image data to the image generator (display unit) 108. Further, the image input unit 101 can determine that the image input unit 101 is not connected to any external apparatuses. Then, the image input unit 101 can perform display indicating that there is not input by outputting a unique pattern from a memory (not illustrated) provided in the controller 103 to the display unit. With this function, it is possible to measure a period of time during which no signal is input from the external apparatus to the projector 100. When no signal is input for a certain period of time, the projector 100 can transfer from the normal mode to the power saving mode. The certain period of time means an arbitrary period of time that can be designated by the user.

As described above, the operation unit 102 detects, for example, which one of the plurality of push buttons is pushed. The controller 103 includes the OSD in an internal memory, and it can change and determine a menu on the OSD in accordance with the push button pressed by the operation unit 102. The menu in the OSD has a power saving mode that can be designated by the user.

In this embodiment, the power saving mode includes a blank mode and a power management mode (PMM). The power management mode is a mode for turning off power of the light source unit 105 and the image generator (display unit) 108. In the blank mode, power saving can be achieved by turning off the power of the light source unit 105 having the highest power consumption in the projector 100. In the power management mode, further power saving can be achieved by turning off the power of the image generator 108 having the highest power consumption next to the light source unit 105. In the power management mode, power for the light source unit 105 and the image generator 108 is turned off, but power for other parts is not turned off. By turning on the power for parts other than the light source unit 105 and the image generator 108, it is possible to shorten the time required for the normal lighting of the light source unit 105.

The blank mode is a mode in which the power supply of only the light source unit 105 is turned off. The blank mode is used when the user sets the projector 100 so as not to intentionally display the projection screen. In the blank mode of a projector using a mercury lamp as a conventional light source, regardless of input image data, a state where nothing is displayed is realized by sending black image data from the controller 103 to the image generator. This is the same as normal lighting and there is no power saving effect. The power saving effect can be obtained by turning off the power supply of the light source, but in the case of the conventional lamp machine, it takes several minutes until re-lighting, which is not practical. On the other hand, in the projector 100 using the excitation light source such as a laser as the light source unit 105 in this embodiment, it is possible to light up instantly, and accordingly in the blank mode of this embodiment, the light source of the light source unit 105 is turned off.

The phosphor driver 104 is a driver that rotates the phosphor unit (wavelength conversion element) 106 constituted by the phosphor layer and the disk-shaped rotating body coated with the phosphor layer in a circumferential direction of the rotating body. For example, the phosphor driver 104 is a motor, but it is not limited thereto as long as it can rotate the phosphor unit 106 in the circumferential direction. Here, the life of the phosphor driver (motor) 104 will be described. In general, the life of the motor is defined by the life of a bearing.

Figure 4:
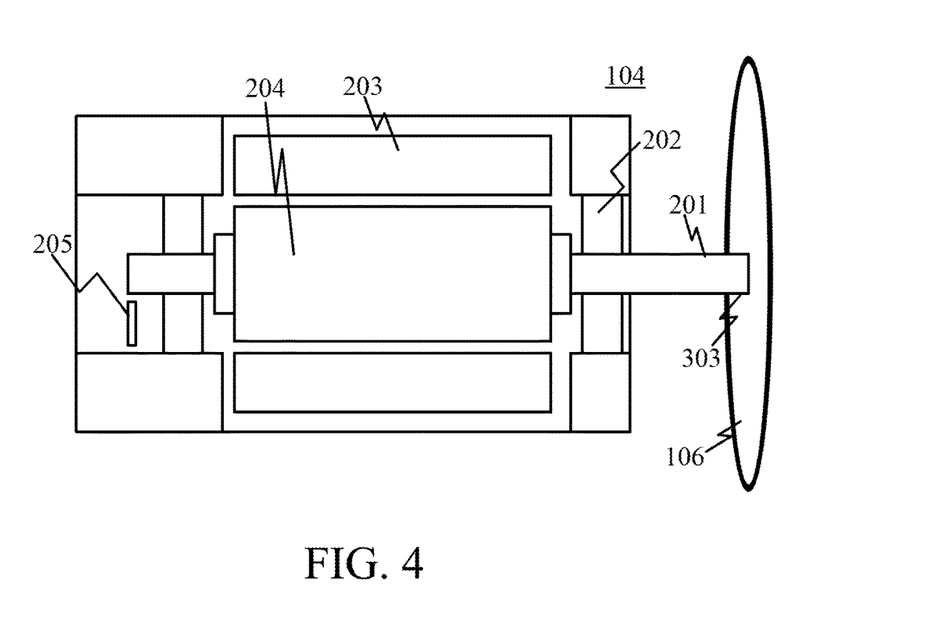
FIG. 4 is a cross-sectional view of a driver (motor) in Embodiment 2.

FIG. 4 is a schematic diagram of the phosphor driver (motor) 104, and it illustrates a cross-sectional view of the motor as seen from the side. A shaft 201 corresponds to a rotation axis of the motor. The tip of the shaft 201 is connected to a connecting portion 303 provided at the center of the phosphor unit 106. A bearing 202 is a mechanical structure for suppressing stress generated when the shaft 201 rotates, and high durability and high lubricity are required for the bearing 202 because wear to the shaft 201 occurs. A stator 203 has a coil shape, and it generates a magnetic field by applying electric energy. A rotor 204 has a coiled shape like the stator, and it receives a magnetic field generated from the stator 203, and it obtains a force rotating in a circular tangential direction by Fleming's law. An encoder 205 detects a rotational speed and a rotational position of the rotor 204. The rotational speed and the rotational position detected by the encoder 205 are transmitted to the controller 103. With such a configuration, power supplied to the motor is converted into a rotational force for rotating the phosphor unit 106.

Subsequently, the life of the bearing 202 will be described. Even when the bearing 202 is used with a normal installation and lubrication under proper load, constant stress is always repeatedly applied to a bearing ring and a rolling body. Since the stress concentrates on a shallow part of a surface, a scaly breakage form can occur on a part of the surface. It is equivalent to the life of the bearing 202 that stress is applied due to repetitive stress during use of the bearing 202 under normal conditions so that it cannot withstand specifications. When the bearing 202 rotates at the constant number of rotations, the basic rated life is represented as a total rotation time by the following expression.

$$Lh=(10^6 * L_{10})/(60n) \quad (1)$$

Lh: Basic rated life expressed in hours [hour]
$L_{10}$=basic rated life [$10^6$ rev]
n=the number of rotations per minute [rpm]

According to expression (1), the basic rated life is inversely proportional to the number of rotations (revolutions) n per minute, and if the number of rotations n per minute doubles, the basic rated life Lh becomes ½. That is, the basic rated life Lh increases as the number of rotations per minute decreases. The phosphor unit 106 is connected to the tip of the phosphor driver 104, and the purpose of rotating it is to prevent the concentration of heat of the phosphor unit 106, and therefore it is impossible to lower the number of rotations more than necessary. However, the power saving mode described above is a mode for turning off the power supply of the light source unit 105, and in this case it is possible to lower the number of rotations. At this time, it is also possible to set the number of rotations to 0, that is, stop the rotation of the phosphor unit 106. However, in order to rotate the phosphor unit 106 again, static inertia works and it takes several seconds to reach the target number of rotations. In the power saving mode, contrary to the requirement of lighting instantly at the time of re-lighting, it is preferable that stopping the rotation of the phosphor unit 106 is avoided. Details of combined operations of each of the power saving modes and the number of rotations of the phosphor driver 104 will be described below.

The light source unit 105 is an excitation light source such as a laser or an LED. As the light source unit 10, a monochromatic laser is often used, and for example, a blue laser is used. In order to perform a full-color display, light of red and green (or yellow) is insufficient, but a phosphor is used as a phosphor unit 106 having a function of converting color (wavelength) to generate yellow light from blue light.

Figure 5:
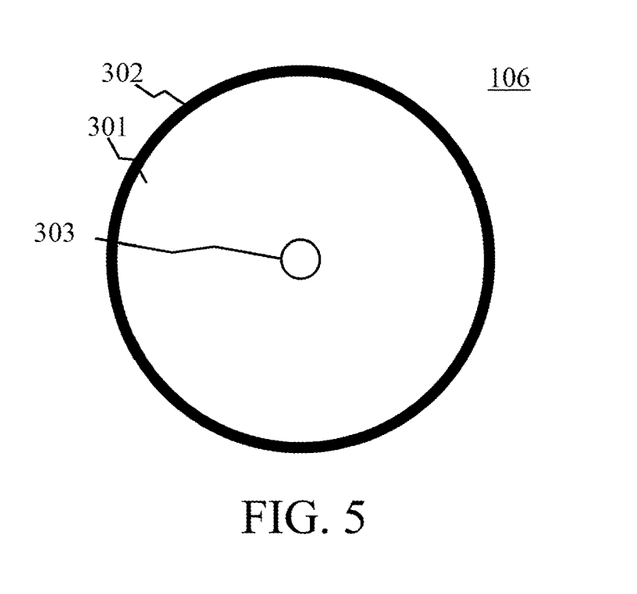
FIG. 5 is a configuration diagram of a phosphor unit in Embodiment 2.

FIG. 5 is a configuration diagram of the phosphor unit 106, and it illustrates a view of the phosphor unit 106 as seen from the front. The phosphor unit 106 includes a rotating body 301 and a phosphor (phosphor layer) 302. The rotating body 301 is made of a reflecting member having a thickness of several millimeters. The phosphor 302 is applied to the outer periphery (black painted portion) of the rotating body 301. When the phosphor 302 is irradiated with blue light, wavelength conversion is performed so that blue light is converted into yellow light. Since the phosphor 302 is coated on the reflecting member, the yellow light is reflected and returned. At the center of the phosphor unit 106, a connecting portion 303 to the shaft 201 of the phosphor driver (motor) 104 is provided.

Figure 6:
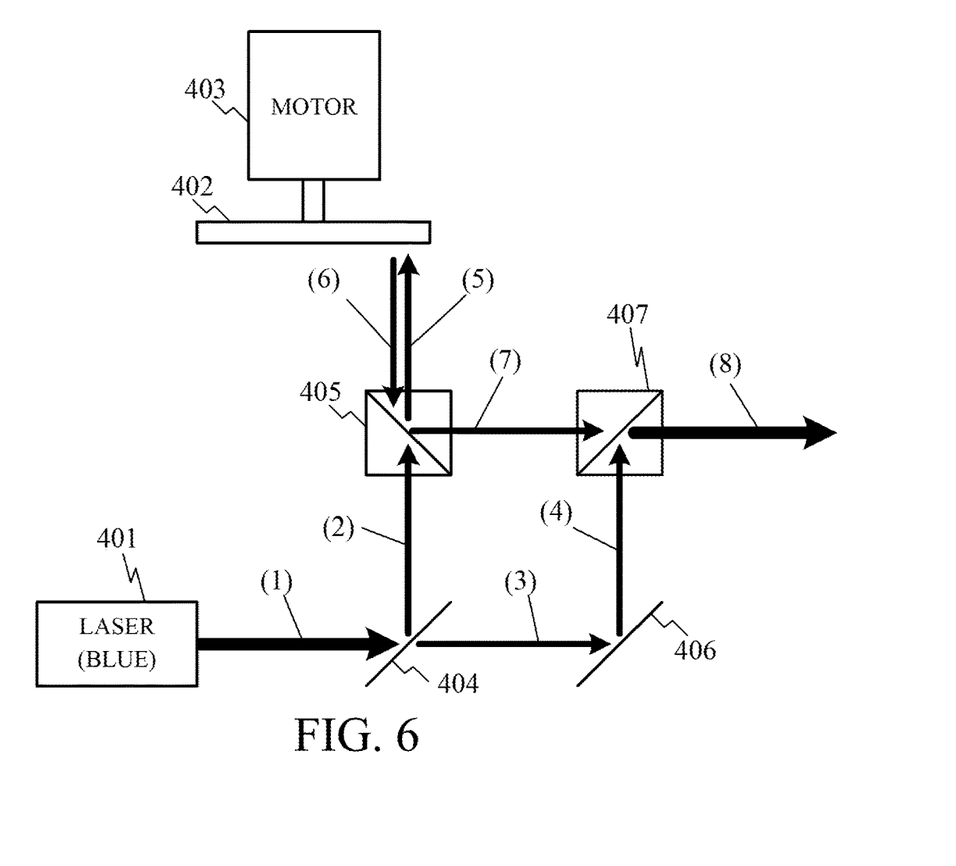
FIG. 6 is a diagram of an optical path including the phosphor unit that generates white color from a monochromatic laser in Embodiment 2.

Next, referring to FIG. 6, an optical path for creating white light from a single color (blue) laser (light source unit 105) will be described. FIG. 6 is an optical path diagram including a wavelength conversion element (phosphor unit) that generates a white color from a monochromatic laser, and it illustrates a diagram corresponding to the configuration including the phosphor driver 104, the light source unit 105, and the phosphor unit 106 in FIG. 3. FIG. 6 illustrates a path using a laser, a wavelength conversion element, a motor, and a prism, and it is a view of the configuration as seen from above.

In FIG. 6, reference numeral 401 denotes a blue laser (light source unit 105). Reference numeral 402 denotes a state in which the phosphor unit 106 illustrated in FIG. 5 is seen from above. Reference numeral 403 denotes a motor (phosphor driver 104). Reference numeral 404 denotes a blue half mirror, reference numeral 405 denotes a prism where the blue color passes and other colors are reflected, reference numeral 406 denotes a mirror, and reference numeral 407 denotes a prism where the blue color reflects and other colors pass. Hereinafter, the color of light passing through each part of such a system will be described.

Reference numeral (1) in FIG. 6 denotes blue light output from the blue laser. Reference numeral (2) denotes blue light reflected by the half mirror 404. Reference numeral (3) denotes blue light that passes through the half mirror 404. An amount of light is (1)=(2)+(3). Reference numeral (4) denotes blue light reflected by the mirror 406. Reference numeral (5) denotes blue light that passes through the prism 405. The blue light (5) is irradiated to the phosphor (phosphor layer) 302 of the wavelength conversion element 402 (phosphor unit 106) to become yellow light, and it is reflected by the mirror of the wavelength conversion element 402. That is, reference numeral (6) denotes yellow light. Reference numeral (7) denotes yellow light reflected by the prism 405. Reference numeral (8) denotes white light obtained by combining the blue light (4) reflected by the prism 407 and the yellow light (7) passing through the prism 407. In this way, white light can be created.

In FIG. 3, the temperature acquirer 107 is a temperature sensor that acquires heat (temperature) of the phosphor unit 106. While it is difficult to directly acquire the temperature by the temperature sensor because the phosphor unit 106 is normally rotated, it may be converted from the ambient temperature in the unit where the phosphor unit 106 is installed after sufficient consideration. However, this embodiment is not limited thereto. For example, a non-contact temperature sensor may be used as the temperature acquirer 107 to directly acquire the temperature of the phosphor unit 106 from the back side (motor side) of the phosphor unit 106. The temperature obtained by the temperature acquirer 107 is notified to the controller 103, and the controller 103 performs control so as to keep the phosphor unit 106 at an appropriate temperature. For example, the controller 103 performs control to increase the number of rotations of the phosphor driver 104 and control to lower the output of the light source 105.

Figure 7:
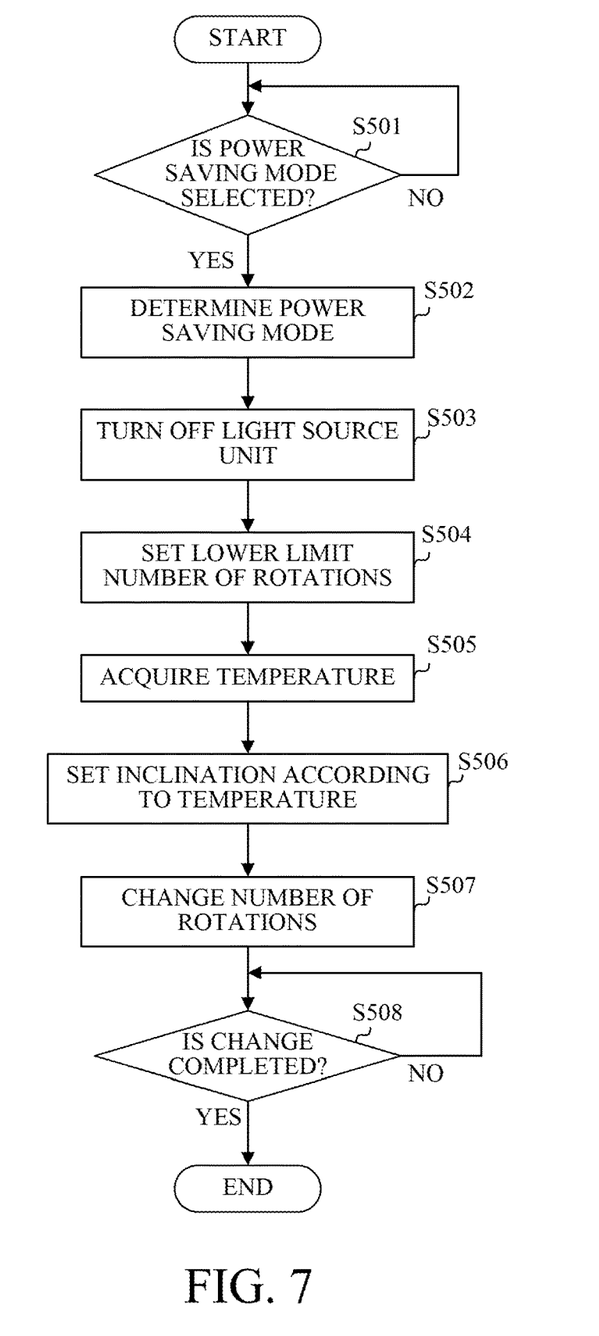
FIG. 7 is a flowchart illustrating an operation of the projection display apparatus in Embodiment 2.

Next, referring to FIG. 7, the operation of the projector 100 will be described. FIG. 7 is a flowchart illustrating the operation of the projector 100. Each step of FIG. 7 is mainly performed based on a command of the controller 103.

First, at step S501, the controller 103 determines whether or not the power saving mode is selected during normal lighting (in a normal mode). The normal lighting (normal mode) is a state in which all the elements illustrated in FIG. 3 are powered and operating. The power saving mode may be intentionally selected by the user or automatically selected by the projector 100. The case where the power saving mode is intentionally selected by the user means a case where the OSD is displayed using the operation unit 102 and the power saving mode prepared in the OSD is selected. On the other hand, the case where the power saving mode is automatically selected by the projector 100 means a case where there is no operation of the operation unit 102 or no signal is input to the image input unit 101 in a predetermined period of time. At this time, the controller 103 determines that the projector 100 is not used, and it automatically transfers to the power saving mode.

When the power saving mode is not selected at step S501, step S501 is repeated until the power saving mode is selected. On the other hand, when the power saving mode is selected, the flow proceeds to step S502. At step S502, the controller 103 determines the power saving mode and performs setting (processing) according to the determined power saving mode. When the user intentionally selects the power saving mode, it is possible to select an arbitrary power saving mode from a plurality of power saving modes such as a blank mode, a power management mode, and the like from the OSD. When there is no operation for a certain period of time or there is no input of a signal, as long as a mode to be transferred automatically is determined in advance, the mode is transferred to the power saving mode in accordance with the determination. In this case, options indicating the relationship between the time and the mode are previously prepared in the projector 100. For example, it is set to transfer to the blank mode when there is no operation and there is no input signal for 15 minutes, or it is set to transfer to the power management mode when there is no input signal and there is no input signal for one hour.

Subsequently, at step S503, the controller 103 stops driving the light source unit 105 (i.e., turns off the light source). The stop of driving the light source unit 105 means a process common to all the power saving modes. Subsequently, at step S504, the controller 103 sets the lower limit number of rotations (target number of rotations) according to the power saving mode.

Figure 8:
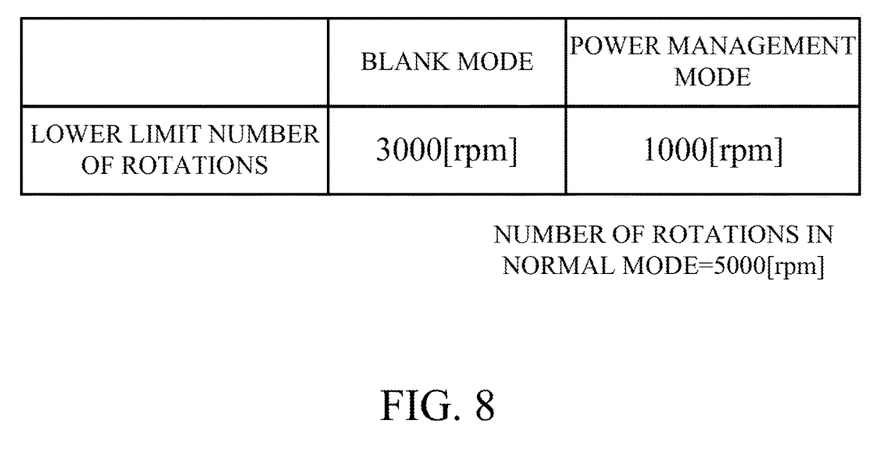
FIG. 8 is a table of illustrating a relationship between a power saving mode and the number of rotations per unit time of the lower limit in Embodiment 2.

FIG. 8 is a table illustrating the relationship between the power saving mode and the lower limit number of rotations (target number of rotations). As illustrated in FIG. 8, the lower limit number of rotations is set in advance according to the power saving mode. In this embodiment, the number of rotations of the motor during the normal lighting (in the normal mode as a first mode) is 5000 [rpm]. On the other hand, in the blank mode (second mode), the lower limit number of rotations is set to 3000 [rpm], and in the power management mode (third mode), the lower limit number of rotations is set to 1000 [rpm]. The lower limit number of rotations varies depending on the power saving mode because the possibility that the driving of the light source unit 105 is resumed (the light source is turned on again) is taken into consideration.

In the blank mode, there are many cases where the light source is temporarily turned off, and the possibility of re-lighting is relatively high, and therefore the lower limit number of rotations is set to the number of rotations close to the number of rotations of 5000 [rpm] during the normal lighting. On the other hand, in the power management mode, the possibility of re-lighting is relatively low, and therefore the lower limit number of rotations is set to the number of rotations sufficiently lowered from the number of rotations of 5000 [rpm] during the normal lighting. However, this embodiment is not limited to these specific values, and other number of rotations may be set.

As described above, in this embodiment, the controller 103 rotates the phosphor unit 106 at the number of rotations per unit time in the first mode (normal mode). The controller 103 decreases the number of rotations of the phosphor 106 to the second number of rotations per unit time in the second mode (power saving mode) where the output of the light source is lowered. Further, the controller 103 decreases the number of rotations of the phosphor unit 106 to the third number of rotations that is different from the second number of rotations (for example, that is smaller than the second number of rotations) in the third mode (power saving mode) where the output of the light source is lowered. In other words, in each of the second mode and the third mode, the controller 103 continues the rotation of the phosphor unit 106 (i.e., it does not stop the rotation). For example, the second mode (blank mode) is a mode for stopping the operation of the light source, and the third mode (power management mode) is a mode for stopping the operations of the light source unit 105 and the image generator 108.

Subsequently, at step S505, the controller 103 acquires the temperature of the phosphor unit 106 from the temperature acquirer 107. Subsequently, at step S506, an inclination (rate of change of the number of rotations) is set according to the temperature of the phosphor unit 106. In this embodiment, the controller 103 changes a specific inclination of the number of rotations of the phosphor unit 106 based on the temperature of the phosphor unit 106. Preferably, when transferring from the normal mode (the first mode) to the power saving mode (the second mode or the third mode), the controller 103 changes the number of rotations of the phosphor unit 106 with the specific inclination (linearly) from the first number of rotations to the second number of rotations (or the third number of rotations). More preferably, when the temperature is a first temperature, the controller 103 sets the specific inclination to a first inclination. Further, when the temperature is a second temperature lower than the first temperature, the controller 103 sets the specific inclination to a second inclination that is steeper (i.e., that is larger in rate of change) than the first inclination.

Subsequently, at step S507, the controller 103 starts changing the number of rotations of the phosphor driver 104 (the phosphor unit 106). Subsequently, at step S508, the controller 103 determines whether or not the change of the number of rotations is completed, that is, whether or not the number of rotations reaches the lower limit number of rotations (target number of rotations). When the change of the number of rotations is not completed, step S508 is repeated. On the other hand, when the change of the number of rotations is completed, this flow is ended.

In this embodiment, a value of the number of rotations to be changed at a time at step S507 changes depending on the specific inclination set at step S506. For example, when the value of the change is −500 [rpm], the number of rotations decreases as 5000−500=4500 [rpm]. However, this embodiment is not limited thereto, and it is also possible to previously set an arbitrary value of change without depending on the temperature. Further, when transferring from the first mode to the second mode (or the third mode), the controller 103 may set the phosphor unit 106 to rotate at the fourth number of rotations between the first number of rotations and the second number of rotations (or the third number of rotations).

In addition, the controller 103 may determine whether or not the temperature acquired at step S505 is a sufficiently cooled temperature (i.e., whether or not the temperature is equal to or lower than an arbitrary threshold temperature (target temperature)) to change a process in accordance with the result. For example, when the temperature is not sufficiently cooled, the temperature determination is repeated until the temperature is sufficiently cooled. In other words, when the temperature is not cooled to the target temperature, cooling is performed in a state where the number of rotations is maintained (i.e., the controller 103 waits for the passage of time). On the other hand, when the temperature is equal to or lower than the target temperature (and when the change of the number of rotations is completed), this flow is ended.

According to this embodiment, after the driving of the light source unit is stopped, the temperature is surely cooled down to the target temperature and the number of rotations can be set depending on each power saving mode. Further, in this embodiment, since the driving of the motor is not completely stopped, the time can be shortened as compared with the time from the stopped state to the number of rotations corresponding to the normal lighting. In addition, the life of the motor can be extended by decreasing the number of rotations based on the relationship between the number of rotations and the life. Therefore, according to this embodiment, it is possible to provide a projection display apparatus capable of realizing power saving and long life of a driver (motor) that rotates a wavelength conversion element (phosphor).

While the projection display apparatus (projector) is described in each embodiment, the present invention is not limited thereto, and can be applied to a display apparatus of various electronic apparatuses such as a liquid crystal television, a mobile phone, a notebook computer, a digital still camera, and a car navigation apparatus.

While the present invention has been described referring to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-023115, filed on Feb. 10, 2017, which is hereby incorporated by reference herein in its entirety.

What is claimed is:

1. A projection display apparatus comprising:
a light source;
a wavelength conversion element configured to convert a wavelength of light from the light source;
a driver configured to rotate the wavelength conversion element;
an image generator configured to generate an image by using light from the light source and light wavelength-converted by the wavelength conversion element; and
a controller configured to control the light source, the driver, and the image generator, wherein the controller is configured to:
in a first mode to project an image with the light source turned on, rotate the wavelength conversion element at the first number of rotations per unit time,
in a second mode to supply the light source with power which is smaller than that supplied to the light source in the first mode, rotate the wavelength conversion element with the second number of rotations per unit time which is smaller than the first number of rotations per unit time, and
in a third mode to supply the light source with power which is smaller than that supplied to the light source in the first mode and to supply the image generator with power that is smaller than that supplied to the image generator in the first mode, rotate the wavelength conversion element with the third number of rotations per unit time which is smaller than the second number of rotations per unit time.

2. The projection display apparatus according to claim 1, wherein the controller is configured to maintain the number of rotations per unit time of the wavelength conversion element in each of the second mode and the third mode.

3. The projection display apparatus according to claim 1, wherein when transferring from the first mode to the second mode or the third mode, the controller is configured to set the number of rotations per unit time of the wavelength conversion element to the fourth number of rotations per unit time that is the number of rotations per unit time between the first number of rotations per unit time and the second number of rotations per unit time or between the first number of rotations per unit time and the third number of rotations per unit time.

4. The projection display apparatus according to claim 1, wherein when transferring from the first mode to the second mode or the third mode, the controller is configured to change the number of rotations per unit time of the wavelength conversion element at a specific rate of change.

5. The projection display apparatus according to claim 4, further comprising a temperature acquirer configured to acquire a temperature of the wavelength conversion element, wherein the controller is configured to change a rate of change of the number of rotations per unit time of the wavelength conversion element based on the temperature of the wavelength conversion element.

6. The projection display apparatus according to claim 5,
wherein when the temperature is a first temperature, the controller is configured to set the specific rate of change to a first rate of change, and
wherein when the temperature is a second temperature that is lower than the first temperature, the controller is configured to set the specific rate of change to a second rate of change that is larger than the first rate of change.

7. The projection display apparatus according to claim 1, wherein the second mode is a mode to turn off the light source, and the third mode is a mode to turn off the light source and stop an operation of the image generator.

8. The projection display apparatus according to claim 1, wherein each of the first to third modes is settable while power of the projection display apparatus is turned on.

9. The projection display apparatus according to claim 1, wherein in each of the second and third modes, power supplied to the light source is larger than zero.

* * * * *